US008389910B2

United States Patent
Bourke, III et al.

(10) Patent No.: US 8,389,910 B2
(45) Date of Patent: Mar. 5, 2013

(54) INDUCTIVELY HEATED WINDSHIELD WIPER ASSEMBLY

(75) Inventors: Michael J. Bourke, III, Brighton, MI (US); Brian L. Clothier, Wichita, KS (US)

(73) Assignee: TSI Technologies LLC, Wichita, KS (US)

( * ) Notice: Subject to any disclaimer, the term of this patent is extended or adjusted under 35 U.S.C. 154(b) by 1102 days.

(21) Appl. No.: 11/835,977

(22) Filed: Aug. 8, 2007

(65) Prior Publication Data

US 2008/0034528 A1    Feb. 14, 2008

Related U.S. Application Data

(60) Provisional application No. 60/836,451, filed on Aug. 9, 2006.

(51) Int. Cl.
*H05B 6/02* (2006.01)
*H05B 6/10* (2006.01)
*B60S 1/02* (2006.01)

(52) U.S. Cl. ........ 219/600; 219/634; 219/635; 219/202; 219/203; 15/250.06

(58) Field of Classification Search .................. 219/202, 219/203, 600, 634, 635, 636; 15/250.04, 15/250.05, 250.06, 250.07, 250.09, 250.19
See application file for complete search history.

(56) References Cited

U.S. PATENT DOCUMENTS

| | | | |
|---|---|---|---|
| 2,677,143 A * | 5/1954 | Blaney | 15/250.06 |
| 5,182,431 A | 1/1993 | Koontz | |
| 5,332,888 A | 7/1994 | Tausch | |
| 5,632,917 A | 5/1997 | Cummins | |
| 6,028,291 A * | 2/2000 | Heisler | 219/203 |
| 6,504,135 B2 * | 1/2003 | Ablah et al. | 219/624 |
| 6,507,973 B1 | 1/2003 | Friesen | |
| 6,657,170 B2 | 12/2003 | Clothier | |
| 6,953,919 B2 | 10/2005 | Clothier | |
| 7,209,042 B2 | 4/2007 | Martin | |
| 2004/0149736 A1 * | 8/2004 | Clothier | 219/627 |
| 2007/0285819 A1 * | 12/2007 | Gerhardinger | 360/48 |

FOREIGN PATENT DOCUMENTS

GB     2227649 A  *  8/1990

OTHER PUBLICATIONS

Preliminary International Search Report and Written Opinion dated Feb. 19, 2009 in corresponding PCT application PCT/US2007/075635 filed on Aug. 9, 2007.

* cited by examiner

*Primary Examiner* — Henry Yuen
*Assistant Examiner* — Hung D Nguyen
(74) *Attorney, Agent, or Firm* — Hovey Williams LLP

(57) ABSTRACT

A wiper assembly having a wiper with an inductively heatable portion, and an induction heating device including an induction work coil which is configured to be placed near the wiper to inductively heat the inductively heatable portion. The inductively heatable portion may be in the wiper blade, the wiper arm which supports the blade, or both. The induction work coil may be placed on or near the windshield or other surface which is cleaned by the wiper and may heat the wiper regardless of its position or only when the wiper is at a specific location such as its retracted "rest" position. The wiper assembly may also include a temperature sensor for sensing a current temperature of the wiper and control circuitry associated with the induction heating device for controlling operation of the work coil.)

19 Claims, 5 Drawing Sheets

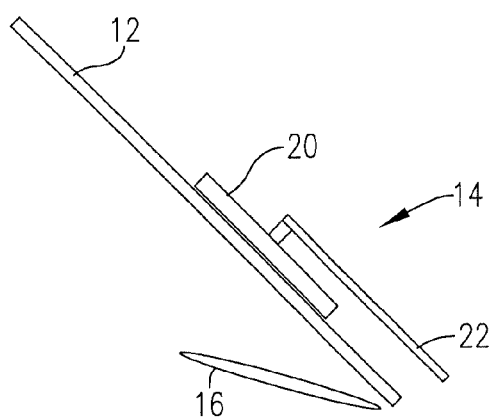
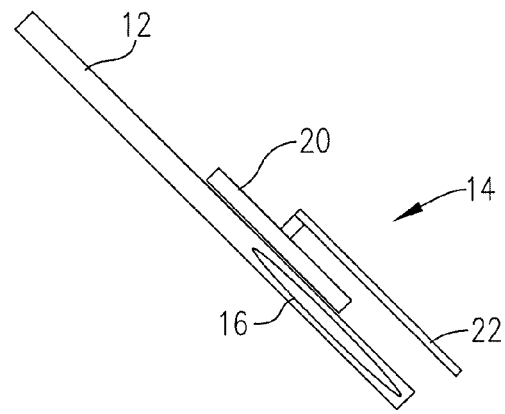
*FIG. 6.*  *FIG. 7.*
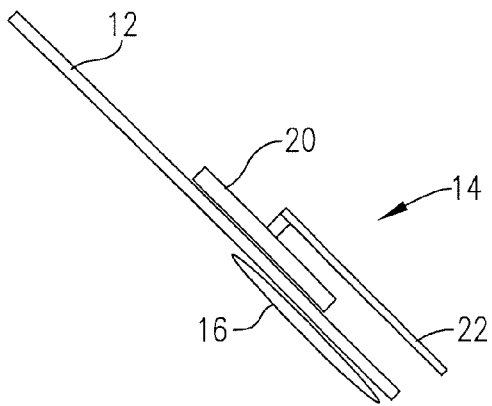
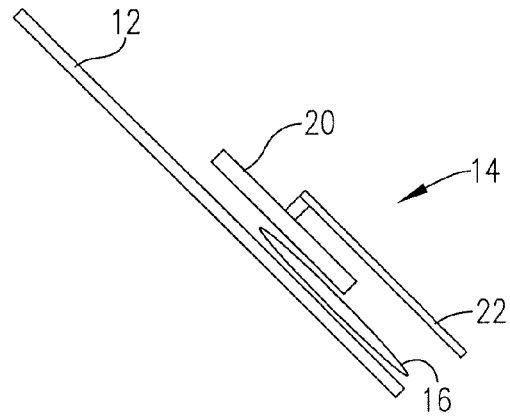
*FIG. 8.*  *FIG. 9.*

INDUCTIVELY HEATED WINDSHIELD WIPER ASSEMBLY

CROSS REFERENCE TO RELATED APPLICATIONS

This application claims the benefit of Provisional Patent Application Ser. No. 60/836,451, filed Aug. 9, 2006, which is incorporated by reference herein. This application is also related to corresponding Non-Provisional patent application Ser. No. 11/619,066, filed Jan. 2, 2007, which is also incorporated by reference herein.

BACKGROUND

1. Field

The present invention relates to windshield wipers and other wiper assemblies. More particularly, the invention relates to an inductively heated wiper assembly.

2. Description of the Related Art

Windshield wiper assemblies often become blocked by ice and snow which accumulates on them and on their windshields. Cold temperatures also often cause wiper fluid lines to freeze and become blocked and wiper blades to become stiff and unpliable. All of these conditions greatly reduce the effectiveness of the wiper assemblies and may lead to unsafe vehicle operation.

Many attempts have been made to heat windshield wiper assemblies and/or their windshields to avoid the above problems, but such attempts have been only partially effective. For example, one prior art approach has been to direct heated air from a vehicle's engine compartment or other source of heat to the vehicle's windshield or wiper assembly. Unfortunately, this approach requires the vehicle's engine to be operated long enough to generate excess heat so as to adequately heat the air before it is directed to the windshield and wiper assembly. This approach is therefore ineffective when a vehicle is first started, requires wasteful engine idling, and requires the use of noisy fans to direct the heated air at the windshield and/or wiper assembly. Moreover, this approach has no means for automatically controlling the delivery of heated air based on the actual temperature of the wiper assembly, thus often resulting in underheating or overheating of the wiper assembly.

Another prior art approach has been to radiantly heat the wiper assemblies with electrically operated resistive heating elements powered by a vehicle's battery or other power source such as a solar cell. Unfortunately, this approach requires unsightly exposed wiring which can be easily damaged.

Accordingly, there is a need for an improved means for heating windshield wiper assemblies and other wiper assemblies.

SUMMARY

The present invention solves the above-described problems and provides a distinct advance in the art of windshield wipers and wiper heating methods. More particularly, the present invention provides for effective and nearly immediate heating of wiper assemblies without exposed wiring and noisy fans. Embodiments of the invention also provide an effective means for automatically maintaining the temperature of a wiper assembly in a desired range. Most importantly, embodiments of the invention provide for automatic anti-icing of wipers, not simply de-icing of wipers after ice has already begun impairing windshield visibility.

A wiper assembly constructed in accordance with one embodiment of the invention comprises a wiper with an inductively heatable portion; and a magnetic induction heating device whose induction work coil is configured to be placed near the wiper to inductively heat the inductively heatable portion of the wiper. The inductively heatable portion of the wiper may be in the wiper blade squeegee, in a frame attached to the wiper blade, in or on a spline on which the wiper blade squeegee is attached, in or on the wiper arm which supports the blade, or all of the above. The induction work coil may be placed on or near the windshield or other surface which is cleaned by the wiper and may heat the wiper regardless of its position or only when the wiper is at a specific location such as its retracted "rest" position.

The wiper assembly may also include a temperature sensor for sensing a current temperature of the wiper and control circuitry within the induction heating device for controlling operation of the work coil. The control circuitry may be a simple manual switch which must be operated to activate the induction coil or may include a closed-loop temperature feedback control system with a controller which reads the current temperature of the wiper from the temperature sensor and automatically activates the work coil whenever the temperature of the wiper falls below a specified temperature set point (such as 35° F.) and de-activates the work coil when the temperature of the wiper rises above another temperature set point (such as 50° F.). Additionally, the operation could be initiated automatically by sensing other ice-buildup producing variables such as humidity and/or vehicle speed. The closed-loop temperature feedback system may utilize RFID tag technology, microwire technology, impedance detection feedback technology, or any other wireless technology for controlling power output from the induction work coil in response to the temperature of the wiper.

Another embodiment of the invention is an inductively heated wiper assembly comprising a wiper; a susceptor coil for placement in contact with a portion of the wiper; and a magnetic induction heating device whose induction work coil is configured to be placed near the wiper to induce current in the susceptor coil. The susceptor coil itself may be a resistive element for converting the induced current to heat or it may be coupled with resistive heating elements for converting the induced current to heat. The susceptor coil may optionally contain an energy storage device (such as a capacitor or a battery) that accumulates energy when in proximity to the work coil field and allows for heating when the susceptor coil is not in proximity to the work coil. As with the previous embodiment, the wiper assembly may also include a temperature sensor for sensing a current temperature of the wiper and control circuitry for controlling operation of the induction heating device and its work coil. The control circuitry may be a simple switch or a closed-loop temperature feedback control system as described above.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein:

FIG. 6 is a schematic diagram of portions of the inductively heated wiper assembly depicting a possible position for the induction work coil.

FIG. 7 is a schematic diagram of portions of the inductively heated wiper assembly depicting another possible position for the induction work coil.

FIG. 8 is a schematic diagram of portions of the inductively heated wiper assembly depicting another possible position for the induction work coil.

FIG. 9 is a schematic diagram of portions of the inductively heated wiper assembly depicting another possible position for the induction work coil.

Figure 1:
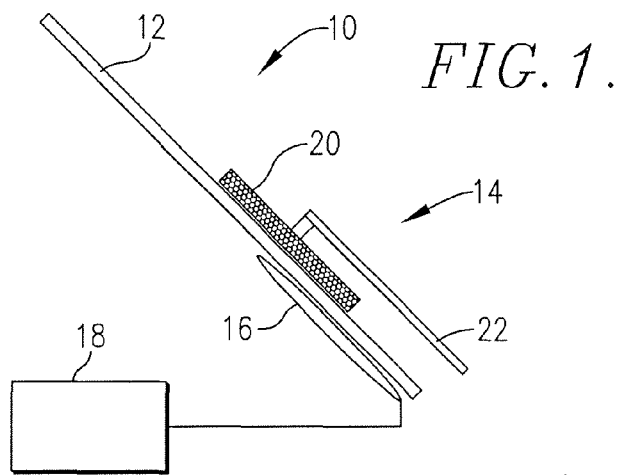
FIG. 1 is a schematic diagram of an inductively heated wiper assembly constructed in accordance with an embodiment of the invention and shown installed on a vehicle windshield or other surface.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the embodiments. The following detailed description is, therefore, not to be taken in a limiting sense. The scope of the present invention is defined only by the appended claims, along with the full scope of equivalents to which such claims are entitled.

Turning now to the drawing figures, and particularly FIG. 1, an inductively heated wiper assembly 10 constructed in accordance with an embodiment of the invention is illustrated and shown with a windshield 12 or other surface to be cleaned or cleared by the wiper assembly. Although the wiper assembly 10 is particularly suitable for use with a vehicle's windshield, it may be used with any surface which is subject to the accumulation of snow or ice or which is operated in cold temperatures.

The embodiment of the wiper assembly 10 shown in FIG. 1 broadly comprises a wiper 14 with an inductively heatable portion; and a magnetic induction heating device 18 with an associated induction work coil 16. As described in more detail below, the magnetic induction heating device 18 and its associated induction work coil 16 inductively heats the inductively heatable portion of the wiper 14 so as to prevent the accumulation of snow or ice on or near the wiper and to keep the wiper from becoming stiff and unpliable. Control circuitry within the induction heating device 18 controls the output of current to the induction work coil 16, and thus power transferred to the wiper, so as to maintain the temperature of the wiper 14 in a desired temperature range.

All the embodiments employ some form of wireless temperature feedback. The primary forms of wireless feedback utilized are RFID temperature feedback, microwire temperature feedback, impedance detection feedback, and the method disclosed by Pacholok in his patent application "RFID Interrogator/Induction heating system" U.S. patent application Ser. No. 11/496,683. The RFID temperature feedback system is fully described in U.S. Pat. Nos. 6,320,169 and 6,953,919. The microwire temperature system and its use in feedback control systems is fully described in U.S. patent application Ser. No. 11/619,066. The impedance detection feedback system is fully described in U.S. Pat. No. 6,232,585. These patents and patent applications are incorporated into the present application by reference.

In more detail, the wiper 14 itself is mostly conventional and includes a wiper blade 20 and a wiper arm 22 for supporting the blade in contact with the surface 12 and for moving the blade over the surface. The wiper blade 20 may be formed of rubber or similar flexible materials and basically acts as a squeegee. The wiper blade 20 may be supported on its wiper arm 22 by a metal or plastic bracket or frame as with conventional wiper assemblies or may be of a newer "bracketless" design in which the blade is attached to a metal band or spline which serves as a backbone for the blade. Examples of bracketless wiper blades are manufactured by Trico under the name Neoform™, by Bosch under the name Icon™, and by Anco under the name Contour™. The wiper 14 may also include associated support structure, gears, and motors for moving the wiper blade 20 and wiper arm 22 over the surface 12 in a conventional manner. When used with a vehicle, two or more wipers 14 may be provided, and the wipers may be heated by a single induction work coil or separate work coils.

Figure 2:
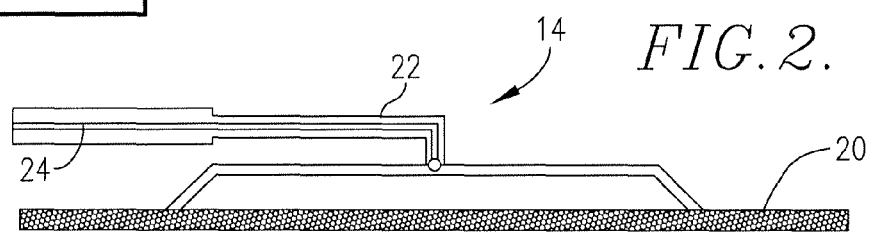
FIG. 2 is a schematic diagram of the wiper portion of the inductively heated wiper assembly with the shaded portion thereof indicating the presence of inductively heatable materials.
Figure 3:
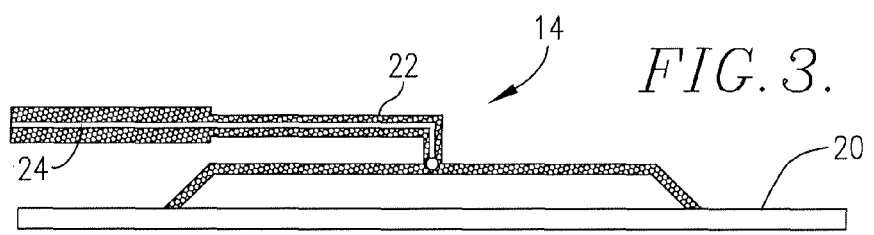
FIG. 3 is another schematic diagram of the wiper portion of the inductively heated wiper assembly with the shaded portion thereof indicating the presence of inductively heatable materials.
Figure 4:
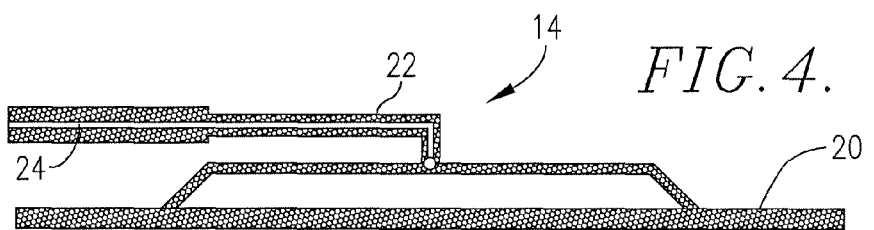
FIG. 4 is another schematic diagram of the wiper portion of the inductively heated wiper assembly with the shaded portion thereof indicating the presence of inductively heatable materials.
Figure 5:
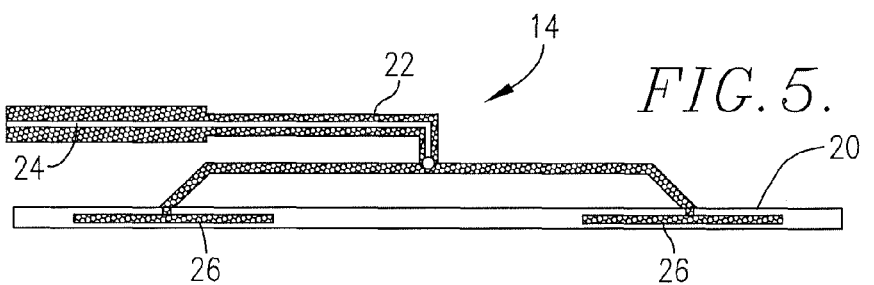
FIG. 5 is another schematic diagram of the wiper portion of the inductively heated wiper assembly with the shaded portion thereof indicating the presence of inductively heatable materials.

The inductively heatable portion of the wiper 14 may be in or on the wiper blade 20, the wiper arm 22, the metal band or spline of the wiper blade, or elsewhere on the wiper. For example, as depicted by the shaded portions of FIG. 2, the entire wiper blade 20 or a portion thereof may be formed of inductively heatable materials. This results in heating of the portion of the wiper which directly touches the windshield or other surface 12. Alternatively, the entire wiper arm 22 or a portion thereof may be formed of inductively heatable materials as illustrated by the shaded portions of FIG. 3. This ensures that a wiper fluid line 24 passing through the arm 22 does not become frozen. In another embodiment, both the wiper blade 20 and the wiper arm 22, or portions thereof, may be formed of inductively heatable materials as illustrated in FIG. 4. This heats both the portion of the wiper which directly touches the windshield and the portion which carries the wiper fluid line. In yet another embodiment, inductively heatable inserts 26 may be molded into or otherwise attached to the wiper blade as illustrated in FIG. 5. This permits heating of the wiper blade 20 while allowing the major portion of the wiper blade to be made of conventional elastomer materials.

In all of these and other embodiments, the inductively heated portions may be made of materials such as those described in U.S. Pat. No. 6,657,170, hereby incorporated by reference. The materials may include graphite, metal, and other heat-retentive materials. Other materials may also be added such as elastomers and other materials commonly found in windshield wiper blades.

The inductively heated portions may also consist of a "susceptor coil", typically copper or graphite traces printed on a substrate material (preferably Kapton, Mylar, or other high temperature polymer) or directly upon the surface to be heated (i.e. on or inside the squeegee, etc.), where the "susceptor coil" is a continuous coil formed of electrically conductive material with a pair of terminal coil ends, and a conductive assembly operably connected between said terminal ends to complete a circuit, said conductive assembly comprising a switch component. This susceptor coil converts its induced current (energy transferred from the nearby work coil) to thermal energy so as to heat the susceptor coil and the object(s) in thermal contact with the susceptor coil. This susceptor coil may also include a capacitor within its continuous coil circuit so as to tune its impedance to enable the most efficient energy transfer from the induction work coil. Furthermore, there may be thermal fuses or other thermal safety switches within the susceptor coil circuit that can open the continuous coil and thus prevent any induced current to flow through the susceptor coil. This "susceptor coil" is described within U.S. Pat. No. 6,504,135 and U.S. patent application Ser. No. 11/603,860 "Resonant Controllable Susceptor for Induction Heating System, Induction Heating System Incorporating Same, and method", both hereby incorporated by reference.

If the susceptor coil is to be made on a flexible substrate that will then be adhered to the wiper surface to be heated, the susceptor coil can be manufactured by standard methods by which flexible circuit boards are manufactured—etching, etc. If the susceptor coil is to be directly printed onto the surface of the squeegee, spline, wiper arm, similar prior art manufacturing methods such as etching, electroplating, flame spraying, etc. may be used.

The induction work coil 16 is placed near the wiper 14 to inductively heat the inductively heatable portion of the wiper. More specifically, the induction work coil 16 may be placed below the windshield or other surface 12 as shown in FIG. 6, within the surface as shown in FIG. 7, attached to a lower face of the surface as shown in FIG. 8, or attached to an upper face of the surface as shown in FIG. 9. The induction work coil may be sized and positioned so as to heat the wiper 14 regardless of its position on the surface 12 or may be sized and positioned so as to heat the wiper 14 only when it is at a specific location such as its retracted "rest" position. The induction heating device 18 and its associated work coil 16 may be powered by the vehicle's battery, its own dedicated battery, or any other power source. The induction heating device 18 and its associated work coil 16 may be similar to the ones disclosed in U.S. Pat. No. 6,320,169, hereby incorporated by reference, or U.S. Pat. No. 6,657,170 mentioned above.

The work coil may be constructed of copper Litz wire or other highly conductive wire or it may be constructed as a flexible printed circuit board. The flexible printed circuit board embodiment is preferably a multi-layer one, such that the printed traces for its closed circuit allow for a less resistive passage of alternating current sufficient to produce an alternating magnetic field above the surface of the work coil and adjacent windshield. The number of coil turns, width of the traces, thickness of the traces, and other parameters of the work coil are all known in the art to affect the impedance of the induction coil, and thus its efficiency in transferring energy to the wiper. One advantage of the embodiments where the work coil is directly adhered to the windshield is that the inevitable heating of the work coil will provide the windshield with heat so as to prevent ice accumulation on that area of the windshield.

The control circuitry within the magnetic induction heating device 18 may be a simple manual switch or button which electrically connects the induction heating device 18 to the vehicle's battery or other source of power. Such a switch may be placed near the windshield wiper on/off switch or anywhere else within easy reach of an operator. The operator may trigger the switch to activate the induction heating device 18 whenever he or she observes snow or ice on the vehicle's windshield or whenever the wiper blade becomes frozen or rigid because of low temperatures. A temperature sensor and wireless communication device, both of which are disclosed in more detail below, may be provided along with the manual switch to automatically turn off the induction heating device 18 whenever the temperature of the wiper exceeds a maximum recommended operating temperature.

In a preferred embodiment, however, the control circuitry within the induction heating device 18 is part of a closed-loop temperature feedback control system which determines the current temperature of the wiper 14 and automatically provides power to the induction work coil 16 whenever the temperature falls below a specified temperature set point such as 35° F. and controls the induction heating device's power output to regulate the temperature of the inductively heatable portion of the wiper 14 about some set point such as 50° F. The closed-loop temperature feedback control system may utilize RFID tag technology, microwire technology, impedance detection feedback technology, or any other wireless technology for controlling operation of the induction work coil 16 in response to the temperature of the wiper, the outside air temperature, or a combination of both.

Figure 13:
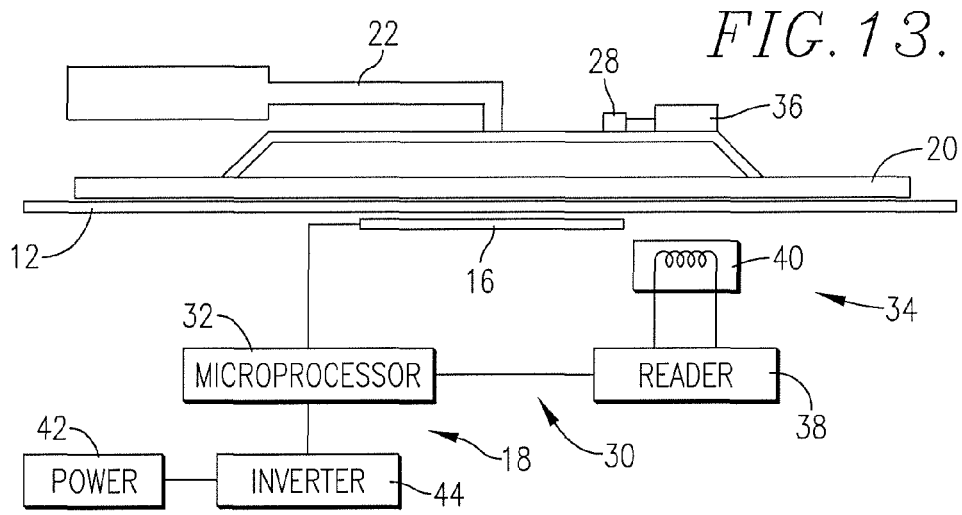
FIG. 13 is a schematic diagram of an embodiment of the inductively heated wiper assembly with a closed-loop temperature feedback control system.

One exemplary embodiment of a wiper assembly employing an induction heating device 18 whose control circuitry is part of a closed-loop temperature feedback control system is shown in FIG. 13 and includes at least one temperature sensor 28 and control circuitry broadly referred to by the numeral 30 for controlling operation of the induction work coil 16 in response to temperature readings from the temperature sensor.

Figure 10:
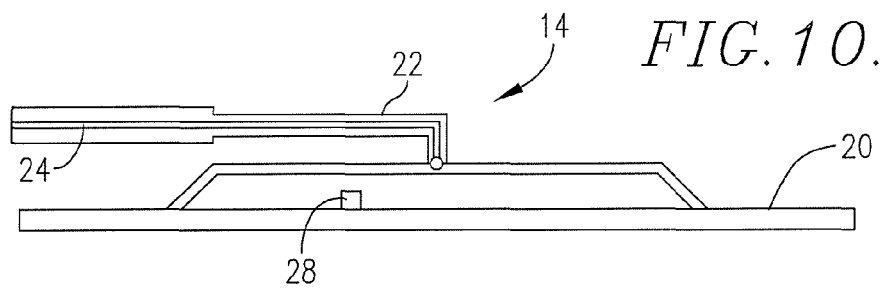
FIG. 10 is a schematic diagram of portions of the inductively heated wiper assembly depicting a possible position for the temperature sensor.
Figure 11:
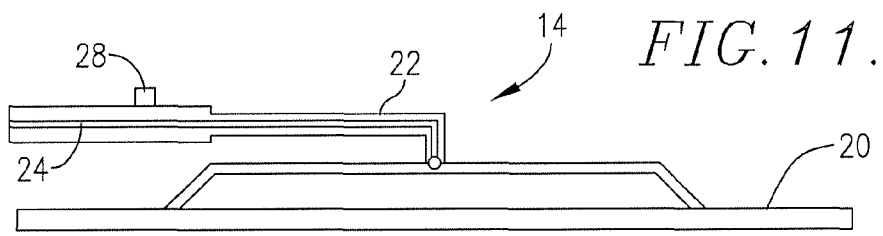
FIG. 11 is a schematic diagram of portions of the inductively heated wiper assembly depicting another possible position for the temperature sensor.
Figure 12:
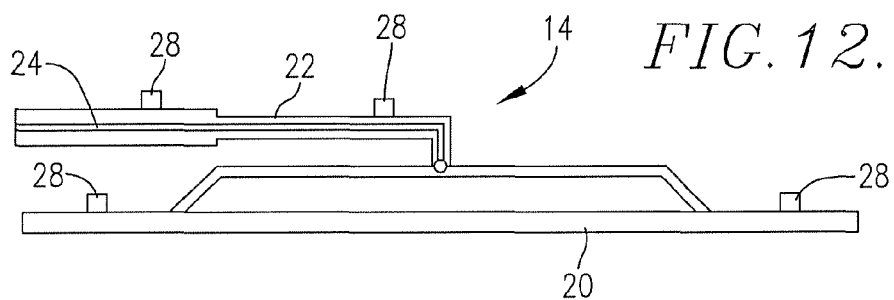
FIG. 12 is a schematic diagram of portions of the inductively heated wiper assembly depicting several possible positions for temperature sensors.

In more detail, the temperature sensor 28 continuously or periodically senses a current temperature of the wiper 14 or the area around the wiper. The temperature sensor 28 may be placed on, or embedded within, the wiper blade 20 as illustrated in FIG. 10, on the wiper arm 22 as illustrated in FIG. 11, or anywhere else which is in thermal contact with a portion of the wiper 14. Multiple temperature sensors 28 may be provided and positioned on various locations on the wiper blade and/or the wiper arm as illustrated in FIG. 12. Alternatively, the auto's existing outside air temperature sensor or an added prior art one may be used to provide the low set point temperature (say 35 C) that is used as a trigger to automatically start the wiper heating operation. The particular location of the temperature sensor or sensors is not important so long as they can detect a temperature which is representative of some portion of the wiper assembly.

The control circuitry 30 of the induction heating device 18 may include a controller, microprocessor, or other computing device 32 operable to control power output from the solid state inverter 44 to the induction work coil 16 and a wireless communication system 34 for reading the current temperatures sensed by the temperature sensor 28. The wireless communication system may be a RFID tag reader 38 and antenna 40 that are coupled with the microprocessor 32 as described in U.S. Pat. No. 6,953,919. The reader 38 and antenna 40 read temperature information from the RFID tag 36 coupled with the temperature sensor 28. In another embodiment, the RFID tag 36 and reader 38 may be replaced with a glass-coated amorphous magnetic microwire sensor coupled with the temperature sensor and a corresponding microwire reader coupled with the microprocessor as described in pending U.S. patent application Ser. No. 11/619,066 referenced above. In other embodiments, an impedance detection feedback control system such as the one discussed in U.S. Pat. No. 6,504,135 may be used. Other wireless communication methods, such as the one described in co-pending application "RFID Interrogator/Induction Heating System" Ser. No. 11/496,683, for transmitting temperature readings from the temperature sensor 28 to the microprocessor 32 may also be used.

In operation of the closed-loop temperature feedback embodiment, the temperature sensor 28 or sensors continuously or periodically measure the current temperature of some portion of the wiper 14. These temperature readings are then provided to the microprocessor 32 by the RFID tag 36 or microwire sensor and the wireless reader 38. Microprocessor 32 then controls power output from the inverter 44, whether through duty cycling, frequency change, or other prior art inverter control schemes, to the induction work coil 16 which in turn inductively heats the inductively heatable portions of the wiper 14 so as to maintain the temperature of the wiper assembly within a desired temperature range. For example, the microprocessor 32 may turn on the induction work coil 16 whenever the temperature of the wiper 14 (or the outside air temperature as read by a prior art outside air temperature sensor) drops below 350 F and turn off the induction work coil 16 whenever the temperature of the wiper 14 exceeds 50° F. In another example, the microprocessor 32 may allow power to the induction work coil only when the temperature of the wiper drops below 35° F. and then cycles power to the work coil as necessary (based upon temperature feedback from the temperature sensor 28) to maintain the temperature of the wiper within a small range of temperatures about 50° F. The microprocessor 32 may instead allow continuous output power from the induction work coil 16 at a reduced power level so as to maintain the wiper assembly at or near a narrower temperature range such as between 40-45° F. A relay (not shown) may be interposed between the induction work coil 16 and the power source 42 so power does not flow to the induction work coil 16.

The control circuitry microprocessor's 32 memory may be used to store operating parameters for the wiper assembly. For example, the memory may store information related to the type of windshield wiper blade attached to the wiper arm, the maximum operating temperature of the wiper blade, the maximum power level of the induction work coil, and the desired temperature range for the wiper assembly. Alternatively, this data may be stored in the RFID tag 36 or microwire sensor and read by the reader 38 upon activation of the induction work coil 16. By storing the data in the RFID tag or microwire sensor mounted on the wiper, the wiper may be swapped with another wiper which may have different operating or mounting characteristics and still be automatically heated to its correct operating temperature by the induction heating device.

Figure 14:
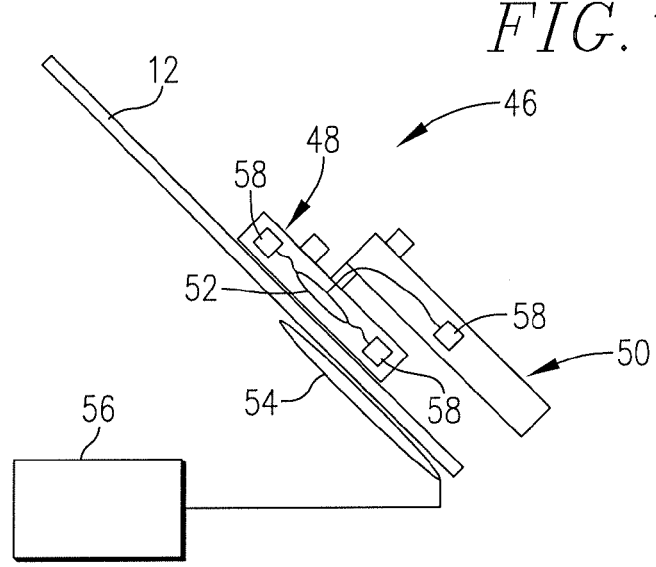
FIG. 14 is a schematic diagram of an inductively heated wiper assembly constructed in accordance with another embodiment of the invention and installed on a vehicle windshield or other surface.
Figure 15:
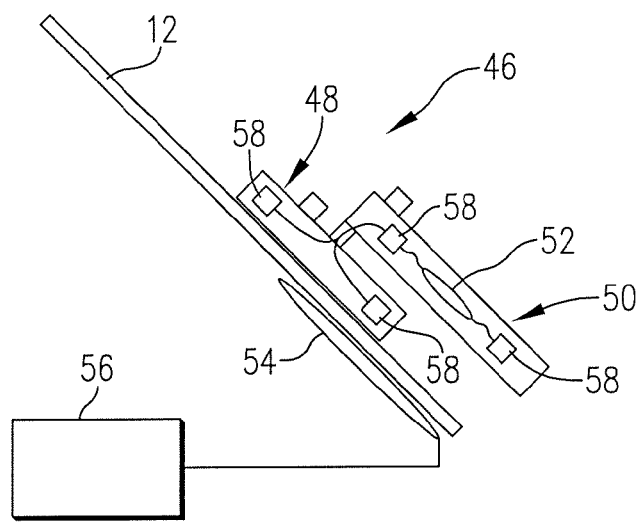
FIG. 15 is a schematic diagram of another embodiment of the inductively heated wiper assembly shown in FIG. 13.

FIGS. 14 and 15 illustrate another embodiment of the wiper assembly in which the inductively heatable portions consist of a susceptor coil. More specifically, the wiper assembly broadly comprises a wiper 46 having a wiper blade 48 and a wiper arm 50; a susceptor coil 52 for placement in contact with a portion of the wiper; an induction work coil 54 configured to be placed near the wiper to induce current in the susceptor coil; and an induction heating device 56 for controlling the power output from its work coil 54.

Figure 16:
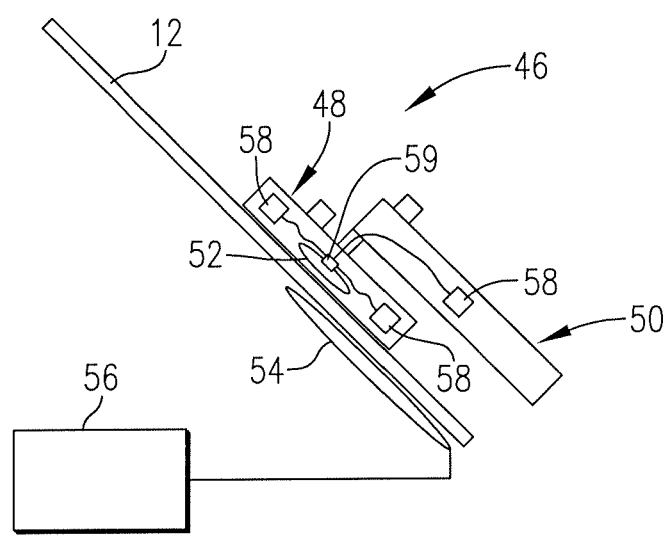
FIG. 16 is a schematic diagram of another embodiment depicting a susceptor containing an energy storage device.

FIG. 16 illustrates another embodiment of the wiper assembly in which the inductively heatable portions consist of a susceptor coil 52, an energy storage device 59 and heating elements 58. More specifically, the wiper assembly broadly comprises a wiper 46 having a wiper blade 48 and a wiper arm 50; a susceptor coil 52 for placement in contact with a portion of the wiper; an induction work coil 54 configured to be placed near the wiper to induce current in the susceptor coil; and an induction heating device 56 for controlling the power output from its work coil 54. The current created in the susceptor coil 52 is converted to stored energy in the energy storage device 59. This energy is then used to activate the heating elements 58, even when the wiper is not in proximity to the work coil. This energy may be regulated by inclusion of a thermal switch to deactivate the heating elements. Alternatively, the input of energy to the energy storage device 59 may be regulated using any form of the wireless temperature feedback to the induction heating device 56 and controlling its output to the work coil 54.

The susceptor coil 52 may be positioned in the wiper blade 48 as shown in FIG. 14, in the wiper arm 50 as shown in FIG. 15, or both. Alternatively, if the wiper 46 has a bracketless type wiper blade as discussed above, the susceptor coil 52 may be attached to or embedded in the metal band or spline of the wiper blade. The susceptor coil is preferably made by fabricating a multi-layer, flexible printed circuit board of Kapton® (polyimide), Mylar® (polyester), TPU (thermoplastic urethane) or any other commonly used flexible circuit substrate. This circuit board may be glued or otherwise adhered to the metal band or the spline of the wiper blade. If the metal band of the wiper blade is composed of ferromagnetic material, then it is preferable to maintain a solid layer of copper on the side of the flexible printed circuit board that is glued to the ferromagnetic metal band. This allows for higher power transfer from the induction work coil to the wiper blade. It is also possible to either metal plate the ferromagnetic metal band, or to make the metal band out of non-ferromagnetic metal such as non-ferromagnetic steel, etc. Heating elements 58, such as resistive heaters, may be coupled with the susceptor coil 52 to receive electrical current therefrom and to convert it to heat.

As with the embodiments illustrated in FIGS. 1-13, the induction heating device 56 may contain control circuitry a simple as a manually activated on/off switch or may contain control circuitry that implements a closed-loop temperature feedback control scheme. In addition to the RFID and microwire wireless communication systems described above, this embodiment may use an impedance detection feedback control scheme with a thermal switch such as the control scheme disclosed in U.S. Pat. No. 6,504,135, hereby incorporated by reference. The thermal switch (usually an inexpensive bimetallic one) is connected in the circuit of the susceptor coil 52 and is in thermal contact with the metal spline of the wiper blade. This temperature control scheme has no real-time multiple temperature sensing capability from the wiper itself to know when to automatically turn on the work coil 54, so if automatic operation is desired, the induction heating device 56 must obtain a temperature reading from the vehicle's outside air temperature sensor.

The embodiments of FIGS. 14, 15 and 16 may also use a temperature feedback control scheme such as the one described in pending patent application Ser. No. 11/496,683 entitled "RFID Interrogator/Induction Heating System", and filed on Jul. 31, 2006. This application is also incorporated herein by reference.

Although the invention has been described with reference to the preferred embodiment illustrated in the attached drawing figures, it is noted that equivalents may be employed and substitutions made herein without departing from the scope of the invention as recited in the claims. For example, the positioning of the various components of the wiper assembly may be altered and the materials used to construct the components may be substituted with other materials.

Having thus described the preferred embodiment of the invention, what is claimed as new and desired to be protected by Letters Patent includes the following:

1. An inductively heated wiper assembly for a windshield having an inner surface, an opposed outer surface, and a thickness between the inner and outer surfaces, said assembly comprising:
    a wiper configured for removing water or other substances from the outer surface of said windshield, the wiper including an inductively heatable portion; and
    an induction work coil operable to generate an alternating magnetic induction field and configured to be placed separate from and in spaced relationship to the wiper and proximal to said inner surface of said windshield remote from said wiper, to inductively heat the inductively heatable portion of the wiper by passage of said magnetic induction field generated by said induction work coil unit through the thickness of said windshield.

2. The wiper assembly as set forth in claim 1, wherein the wiper includes a wiper blade for removing water or other substances from said outer surface of said windshield, and a wiper arm for supporting the blade in contact with said outer surface, wherein the inductively heatable portion is in the wiper arm.

3. The wiper assembly as set forth in claim 1, wherein the wiper includes a wiper blade for removing water or other substances from said outer surface of said windshield, and a wiper arm for supporting the blade in contact with said outer surface, wherein the inductively heatable portion is in the wiper blade and the wiper arm.

4. The wiper assembly as set forth in claim 1, further including control circuitry coupled to the induction work coil and configured to activate the induction work coil based on an environmental condition.

5. The wiper assembly as set forth in claim 1, further comprising:
    a temperature sensor configured to be placed in thermal contact with the inductively heatable portion of the wiper and operable to sense a current temperature of the wiper; and
    control circuitry associated with the induction work coil for reading the current temperature from the temperature sensor and for controlling operation of the work coil to maintain the current temperature of the wiper in a desired temperature range.

6. The wiper assembly as set forth in claim 5, further including an RFID tag coupled with the temperature sensor and an RFID reader operable to read the current temperature from the RFID tag.

7. The wiper assembly as set forth in claim 5, further including a microwire temperature sensor and a microwire reader operable to read the current temperature from the microwire temperature sensor.

8. An inductively heated wiper assembly for a windshield having an inner surface, an opposed outer surface, and a thickness between the inner and outer surfaces, said assembly comprising:
    a wiper configured for removing water or other substances from the outer surface of a said windshield;
    a susceptor coil for placement in contact with a portion of the wiper; and
    an induction work coil operable to generate an alternating magnetic induction field and configured to be placed separate from and in spaced relationship to the wiper and proximal to the inner surface of said windshield remote from said wiper, to induce current in the susceptor coil to heat the susceptor coil or a heating element in electrical contact with the susceptor coil, by passage of said magnetic induction field generated by said induction work coil through the thickness of said windshield.

9. The wiper assembly as set forth in claim 8, further including a thermal switch electrically connected to the susceptor coil and control circuitry coupled to the induction work coil and configured for controlling operation of the work coil in response to the thermal switch.

10. The wiper assembly as set forth in claim 8, wherein the wiper includes a wiper blade for removing water or other substances from said outer surface of said windshield, and a wiper arm for supporting the blade in contact with said outer surface, wherein the susceptor coil is in the wiper blade.

11. The wiper assembly as set forth in claim 9, further including control circuitry coupled to the induction work coil and configured to activate the induction work coil based on an environmental condition.

12. The wiper assembly as set forth in claim 8, further comprising:
    a temperature sensor configured to be placed in thermal contact with the wiper and operable to sense a current temperature of the wiper; and
    control circuitry coupled to the induction work coil and configured for reading the current temperature from the temperature sensor and for controlling operation of the work coil to maintain the current temperature above a desired set point.

13. The wiper assembly as set forth in claim 12, further including an RFID tag coupled with the temperature sensor and an RFID reader operable to read the current temperature from the RFID tag.

14. The wiper assembly as set forth in claim 12, further including a microwire temperature sensor and a microwire reader operable to read the current temperature from the microwire temperature sensor.

15. The wiper assembly as set forth in claim 12, wherein the wiper includes a wiper blade having a spline, wherein the susceptor coil is attached to the spline.

16. An inductively heated wiper assembly for a windshield having an inner surface, an opposed outer surface, and a thickness between the inner and outer surfaces, said assembly comprising:
    a wiper configured for removing water or other substances from the outer surface of a said windshield;

a resonant susceptor coil for placement in contact with a portion of the wiper; and an induction work coil operable to generate an alternating magnetic induction field and configured to be placed separate from and in spaced relationship to the wiper and proximal to the inner surface of said windshield remote from said wiper, to induce current in the resonant susceptor coil to heat the resonant susceptor coil or a heating element in electrical contact with the resonant susceptor coil, by passage of said magnetic induction field generated by said induction work coil through the thickness of said windshield.

17. A system for inductively heating a wiper operable to remove water or other substances from the outer surface of a windshield having an inner surface, an opposed outer surface, and a thickness between the inner and outer surfaces, the system comprising:

an induction work coil operable to generate an alternating magnetic induction field and configured to be placed separate from and in spaced relationship to the wiper and proximal to the inner surface of said windshield; and a susceptor coil configured to be placed proximal to said outer surface of said windshield for heating the wiper when subjected to a current induced by the induction work coil, said magnetic induction field passing through the thickness of said windshield from said induction work coil to said susceptor coil to induce said current in said susceptor coil.

18. The system as set forth in claim 17, wherein the susceptor coil heats the wiper by delivering the induced current to a heating element coupled with the wiper.

19. The system as set forth in claim 17, further comprising:

a temperature sensor configured to be placed in thermal contact with the wiper and operable to sense a current temperature of the wiper; and control circuitry coupled to the induction work coil and configured for reading the current temperature from the temperature sensor and for controlling operation of the work coil to maintain the current temperature above a desired set point.

* * * * *